United States Patent [19]

Morris et al.

[11] Patent Number: 4,687,430
[45] Date of Patent: Aug. 18, 1987

[54] CO-EXTRUSION DIE

[76] Inventors: Dennis Morris, Filmaster, Inc.; 561 Rte. 46, Fairfield, N.J. 07006; Frank Goffreda, 1 Higa Ter., Union, N.J. 07038

[21] Appl. No.: 842,142

[22] Filed: Mar. 21, 1986

[51] Int. Cl.⁴ .............................................. B29C 47/06
[52] U.S. Cl. .............................. 425/133.1; 264/209.8; 425/380; 425/462
[58] Field of Search ...................... 425/133.1, 462, 463, 425/376 R, 376 A, 380, 381, 461, 466; 264/171, 173, 209.1, 209.2, 209.3, 209.8

[56] References Cited

U.S. PATENT DOCUMENTS

| | | | |
|---|---|---|---|
| 3,583,034 | 6/1971 | Colombo | 425/380 X |
| 3,649,143 | 3/1972 | Papesh et al. | 425/133.1 X |
| 3,957,566 | 5/1976 | Rahlfs | 425/114 X |
| 4,042,661 | 8/1977 | Cook | 264/173 |
| 4,045,154 | 8/1977 | Ratheiser | 425/467 |
| 4,182,603 | 1/1980 | Knittel | 425/133.1 |
| 4,185,954 | 1/1980 | Murakami et al. | 425/462 |
| 4,207,045 | 6/1980 | Rasmussen | 425/133.1 |
| 4,226,822 | 10/1980 | Yoshikawa et al. | 264/173 |
| 4,359,354 | 11/1982 | Bohm | 264/173 X |
| 4,504,210 | 3/1985 | Titz et al. | 264/209.8 X |
| 4,522,775 | 6/1985 | Briggs et al. | 264/173 X |

FOREIGN PATENT DOCUMENTS

| | | | |
|---|---|---|---|
| 2059898 | 6/1972 | Fed. Rep. of Germany | 425/380 |
| 4320772 | 6/1968 | Japan | 425/380 |

*Primary Examiner*—Richard L. Chiesa
*Attorney, Agent, or Firm*—Thomas L. Adams

[57] ABSTRACT

A co-extrusion die can simultaneously extrude different extrudate into a multilayer tube. The die has a plurality of mandrels and a casing having an inlet side and an outlet side. The mandrels are coaxially nested in the casing. This casing is shaped on the interior of its outlet side to mate with the mandrels and provide an annular outlet. The casing and the mandrels are positioned and shaped to provide a plurality of interspaces. At least one of the interspaces is shaped to define an annular passage. Another interspace is shaped to define a spiral passage. These annular and spiral passages communicate with the annular outlet.

32 Claims, 13 Drawing Figures

CO-EXTRUSION DIE

BACKGROUND OF THE INVENTION

The present invention relates to co-extrusion dies and, in particular, to multiple, coaxial mandrels arranged to provide a layered tube.

It is known to extrude tubing by means of a die having a casing fitted with a mandrel to provide an interspace for extrusion. The mandrel is held in the casing by webs that span between the mandrel and casing to support the mandrel.

It is also known to extrude a tube by means of a spiral groove on a cylinder fitted into a casing. The spiral groove moves the extrudate around the circumference of the cylinder to spread it more evenly and prevent streaking. Eventually, the spiral grooves on the cylindrical surface terminate so that the extrudate is formed into a uniform tube as it exits an annular outlet. Known co-extrusion dies have used a number of nested, spiral-extrusion mandrels. The several resulting layers of extrudate can then be joined at one point to form a multilayer tube. However, the joining of extrudate has not been precisely controlled in the past and therefore irregularities often occur.

It is known to employ an extruder that drives extrudate into a rotator tube to deliver extrudate to a die. Known assemblies for delivering the extrudate to the rotator tube have been configured to allow extrudate to stagnate around its point of delivery to the rotator tube. Consequently, overheating and inconsistent results have resulted from inconsistent delivery times.

Accordingly, there is a need for an improved co-extrusion die and extrusion system for providing multi-layered tubes for bags and the like, which avoids the disadvantages of the prior art.

SUMMARY OF THE INVENTION

In accordance with the illustrative embodiments demonstrating features and advantages of the present invention, there is provided a co-extrusion die for simultaneously extruding different extrudate into a multilayer tube. The die includes a plurality of mandrels and a casing having an inlet side and an outlet side. The mandrels are coaxially nested within the casing. This casing is shaped, on the interior of its outlet side, to mate with the mandrels and provide an annular outlet. The casing and the mandrels are positioned and shaped to provide a plurality of interspaces. At least one of the interspaces is shaped to define an annular passage. Another interspace is shaped to define a spiral passage. These annular and spiral passages communicate with the annular outlet.

In another embodiment of the same invention, the above mentioned casing cooperates with a pluraliy of mandrels coaxially nested within the casing. The casing is shaped on the interior of its outlet side to mate with the mandrels and provide an annular outlet. The casing and the mandrels are positioned and shaped to provide a plurality of interspaces communicating with the annular outlet. The die also includes a plurality of nested tubes coaxially connected to the outlet side of the casing to form a plurality of axial passageways. Each of the interspaces is shaped to communicate with a corresponding one of the axial passageways. Also included is a flow means connected to the downstream end of the nested tubes and having a plurality of inlet conduits. Each of the inlet conduits communicates with a corresponding one of the axial passageways. The flow means is operable at at least a predetermined one of the inlets to divert the extrudate away from stagnation points about that one of the tubes facing the predetermined one of the conduits.

By employing equipment of the foregoing type, a highly improved co-extrusion die is achieved. In a preferred embodiment, five nested mandrels define five interspaces through which extrudate flows. One (for example a central one) provides an annular cylindrical space to create the so called "spider" extrusion. The other interspaces are bordered by a cylindrical surface having spiral grooves to achieve extrusion of the "spiral" type. In this preferred embodiment each inlet emerging from the mandrel for feeding its spiral grooves, has a diverting bushing to smoothly inject extrudate into the spiral passageway.

It is also preferred to taper the spiral grooves. This increases the velocity and pressure within the grooves and tends to distribute the extrudate from the groove more evenly and rapidly into the annular space, where the final formation occurs. Moreover, in the preferred embodiment, mandrels may be readily substituted so that a particular layer can be changed from a "spider" to a "spiral" type of extrusion, depending upon the desired characteristics of the finished product and the type of extrudate being employed.

A preferred method of spacing the mandrels providing the "spider" type of flow is by flow splitters, each having opposing bosses that project from a lenticular plate at different angles. This angling of the bosses allows easy assembly and substitution of mandrels.

Also in a preferred embodiment, a venturi injection tube accelerates extrudate as it flows into tubes feeding the die. Preferably, a splitting fin is placed at the outlet of the venturi tube. Also preferred is an annular ramp that encircles the tube to push extrudate upwardly. Consequently, extrudate coming into the tubes is immediately diverted away from the venturi tube and pushed up the ramp. This avoids stagnation near or below the venturi inlet and also on the opposite side of the tube.

In a preferred co-extrusion die, the mandrels are nested to provide a frusto-conical, layering path for forming the multiple layers. The extrudate is injected layer by layer at spaced positions. The frusto-conical area converges so that during the staggered formation of the multiple layers, the extrudate slows down to allow a stable and controlled formation of the tubular product.

BRIEF DESCRIPTION OF THE DRAWING

The above brief description as well as other features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
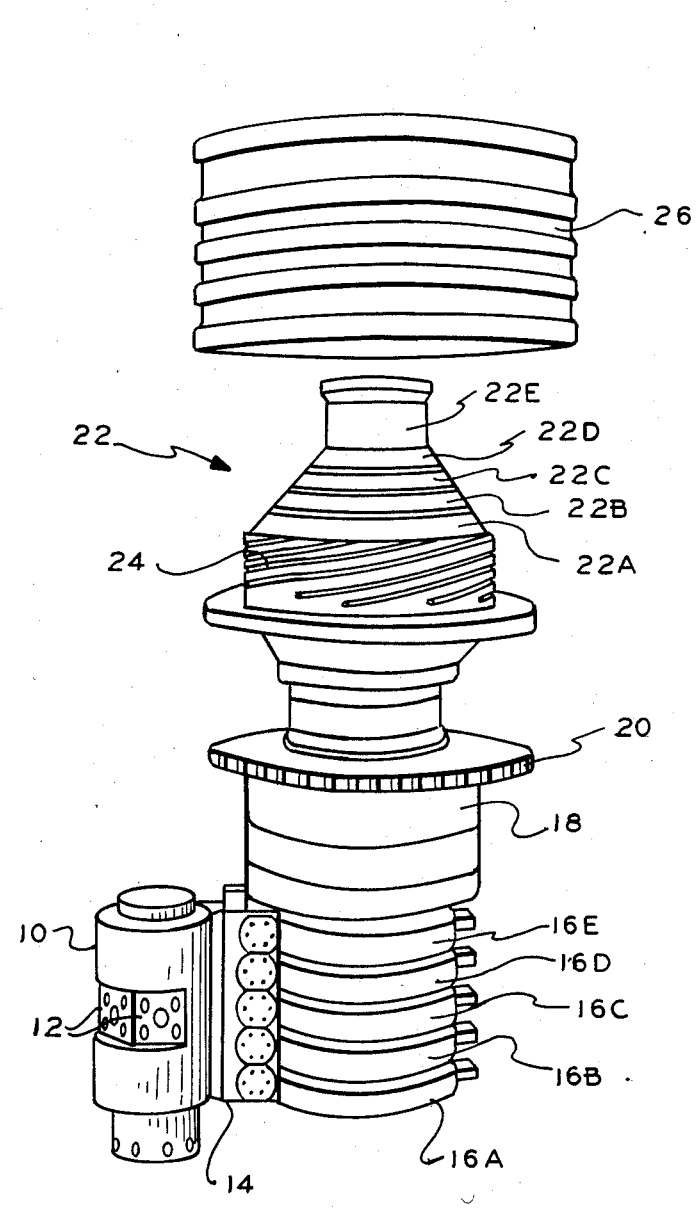
FIG. 1 is a perspective view of a co-extrusion die with its casing head removed to reveal the inner mandrels, according to the principles of the present invention.

Referring to FIG. 1, an overall view is given of a co-extrusion die. A diverter block 10 has a plurality of inlets 12. Inlets 12 can be connected to commercially available extruders. Diverter block 10 can act like a manifold to direct the extrudate from several sources into, in this case, five separate flow paths. The extrudate then passes thorough flow valve 14 into the block assembly composed of five blocks 16A, 16B, 16C, 16D and 16E. Extrudate can flow upwardly through bearing assembly 18 and through rotating/oscillating gear 20 up between mandrels 22. In this embodiment five mandrels are shown: mandrels 22A, 22B, 22C, 22D and 22E. It will be noted that outer mandrel 22A has eight spiral grooves 24 on its outside cylindrical surface. Mandrels 22 are to be covered by a casing 26 that has a generally cylindrical shape but an interior surface shaped to match mandrels 22, while still providing a flow space for the extrudate.

Figure 2:
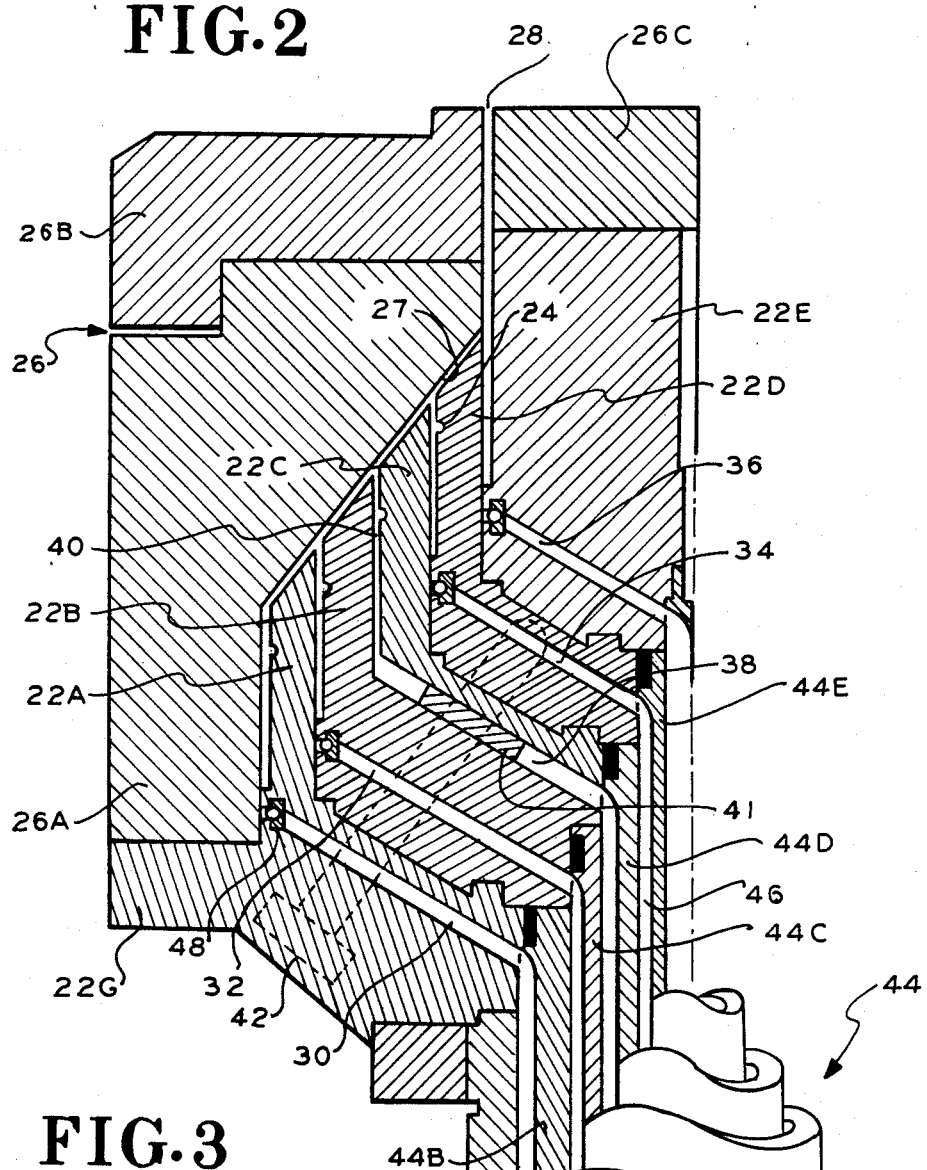
FIG. 2 is a sectional view of the upper portions of the die of FIG. 1.
Figure 3:
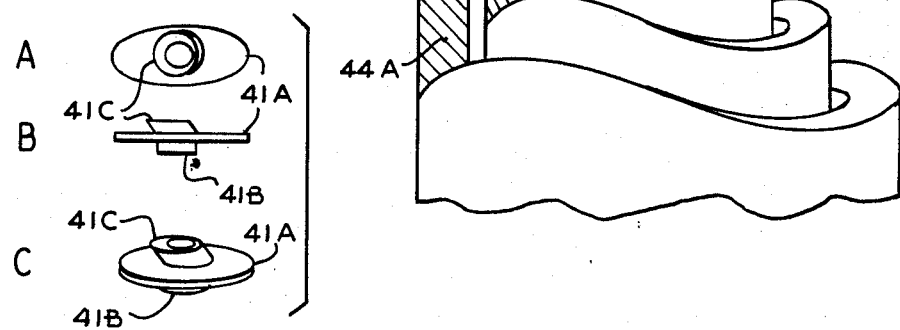
FIGS. 3A, 3B and 3C are top, side and perspective views, respectively of the web of FIG. 2.
Figure 4:
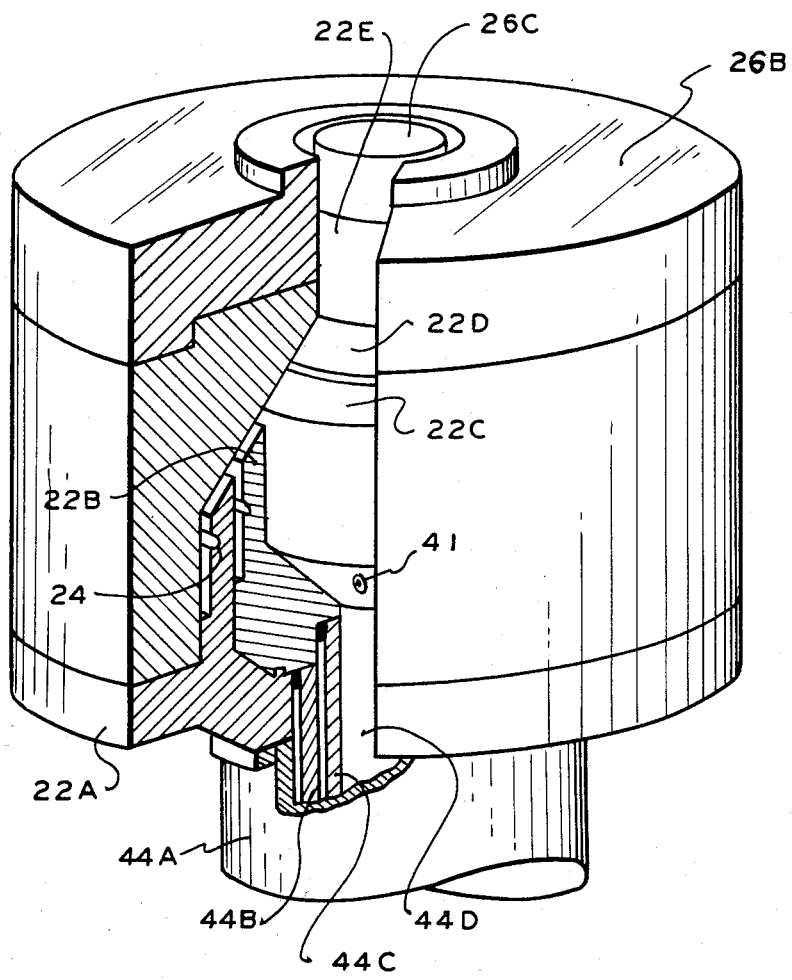
FIG. 4 is a perspective view of the upper portion of the die of FIG. 1 with a section cut away for illustrative purposes.

Referring to FIGS. 2, 3 and 4, mandrel 22E is shown as a generally cylindrical plug with a somewhat conical bottom. Mandrels 22B, 22C and 22D are somewaht cup-shaped with central apertures. Mandrel 22A has a shape similar to the three central mandrels except that mandrel 22A has an outer flange 22G shaped to engage the main casing section 26A. Casing 26 is shown having a cylindrical outer surface and an interior wall that is cylindrical at the top and bottom and frusto-conical in the center. Main casing 26A is capped by cover 26B and cap 26C. There is provided between covers 26B and cap 26C an anular outlet 28 through which extrudate can flow.

As illustrated, the mandrels 22A-22E form with casing 26 five interspaces having a slanted upstream portion: for example, bores 30, 32, 34 and 36. Bores 30-36 may be formed by drilling eight spaced holes in a frustro-conical pattern. In contrast, the upstream portion of the central interspace has an annular, frusto-conical passage 38. Passage 38 leads to cylindrical, annular passage 40 of the interspace. While passage 40 is annular, the other working portions of the interspaces, (the interspaces at the outside of the cylindrical portions of mandrels 22A, 22B, 22D and 22E) are of the spiral type and include spiral grooves such as groove 24, so that these working sections are referred to as spiral passages. It will be noted by examining mandrels 22A-22E that adjacent mandrels rest upon and touch each other, except in the case of the joint between mandrels 22B and 22C. In this case, the spacing and support is provided by eight webs such as web 41. As illustrated, web 41, is held in position by bolt 42, which may be threaded through several of the mandrels and through the center of web 41. Web 41, (as shown in FIG. 3) employs a lenticular plate 41A that has an ellipsoidal or parabolic plan. The plate has on opposite sides, bosses 41B and 41C. The axis of the latter being nonperpendicular to the plate. As revealed in FIG. 2, the canting of the bosses allows web 41 to be readily inserted and removed from the mandrels.

Mandrels 22A-22E are shown connected to a plurality of nested tubes 44. These coaxial tubes 44 form a plurality of axial passageways such as passageway 46. Tube 44A is shown thrust against the bottom mandrel 22A. The interior of tube 44A communicates with bores 30 of the mandrel 22A. Tube 44B is shown thrust against the bottom of mandrel 22B to communicate with its bores 32. Tube 44C is shown inserted into a countersunk bore in mandrel 22B to communicate with the annular passage 38. Tube 44D is shown thrust against the bottom of mandrel 22D to communicate with its bores 34. Tube 44E is thrust against the bottom of mandrel 22E to communicate with its bore 36. It will be appreciated that each of the bores 30, 32 34 and 36 are distributed on a conical surface to feed separate spirals on the outside of its respective mandrel.

It will be noted that each of the bores 30, 32, 34 and 36 feed a bushing such as bushing 48. The bushing will be described in greater detail hereinafter but it will be noted that this bushing is designed to divert the radial component of the extrudate flow into a primarily tangential component.

Figure 5:
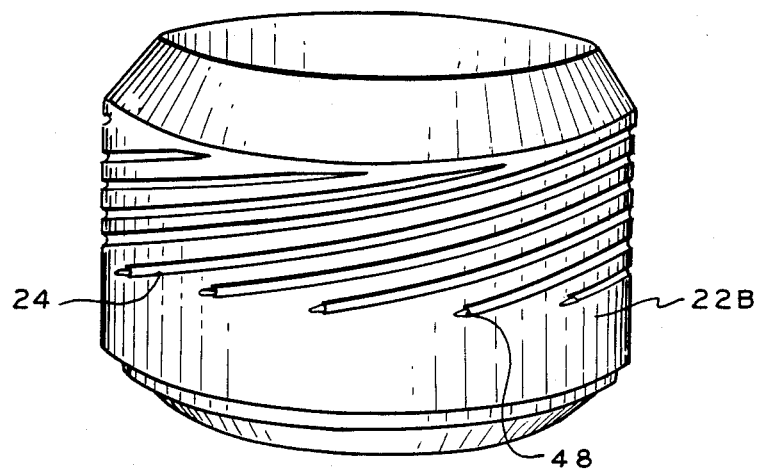
FIG. 5 is a perspective view of one of the mandrels of FIG. 1 illustrated separately.
Figures 6A, 6B, 6C:
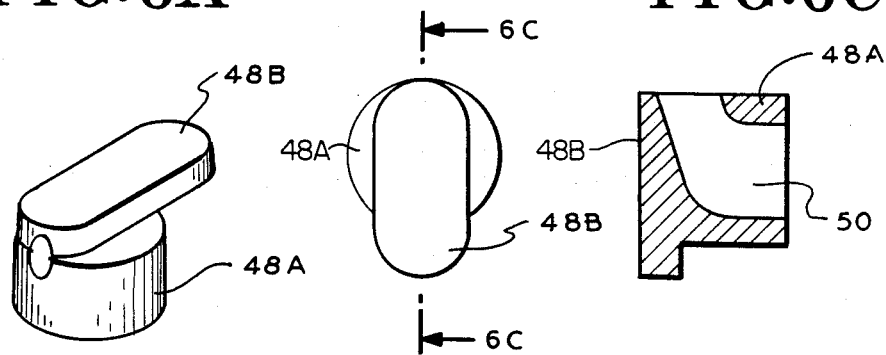
FIGS. 6A, 6B, 6C and 6D are perspective view, top view, sectional view (along line 6C—6C of FIG. 6B) and a rear view, respectively, of the flow bushing shown as an inlet port for the spiral grooves in the mandrel of FIG. 5.
Figure 6D:
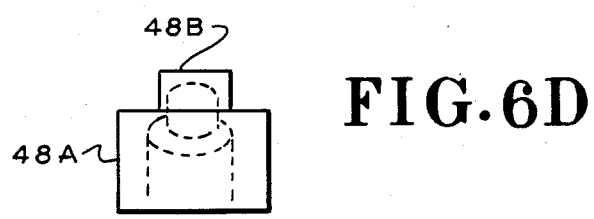

Referring to FIGS. 5 and 6, previously mentioned mandrel 22B is shown separately to reveal a plurality of feed ports in which bushing 48 is inserted. As shown in FIG. 6, bushing 48 comprises a cylindrical base 48A integral with a lenticular plate 48B. An internal bore 50 is shown communicating through the base of cylindrical component 48A to the front, at the juncture between plate 48B and base 48A. Being thus shaped, extrudate can smoothly turn at the surface of the mandrel to facilitate an even distribution of extrudate.

Figure 7:
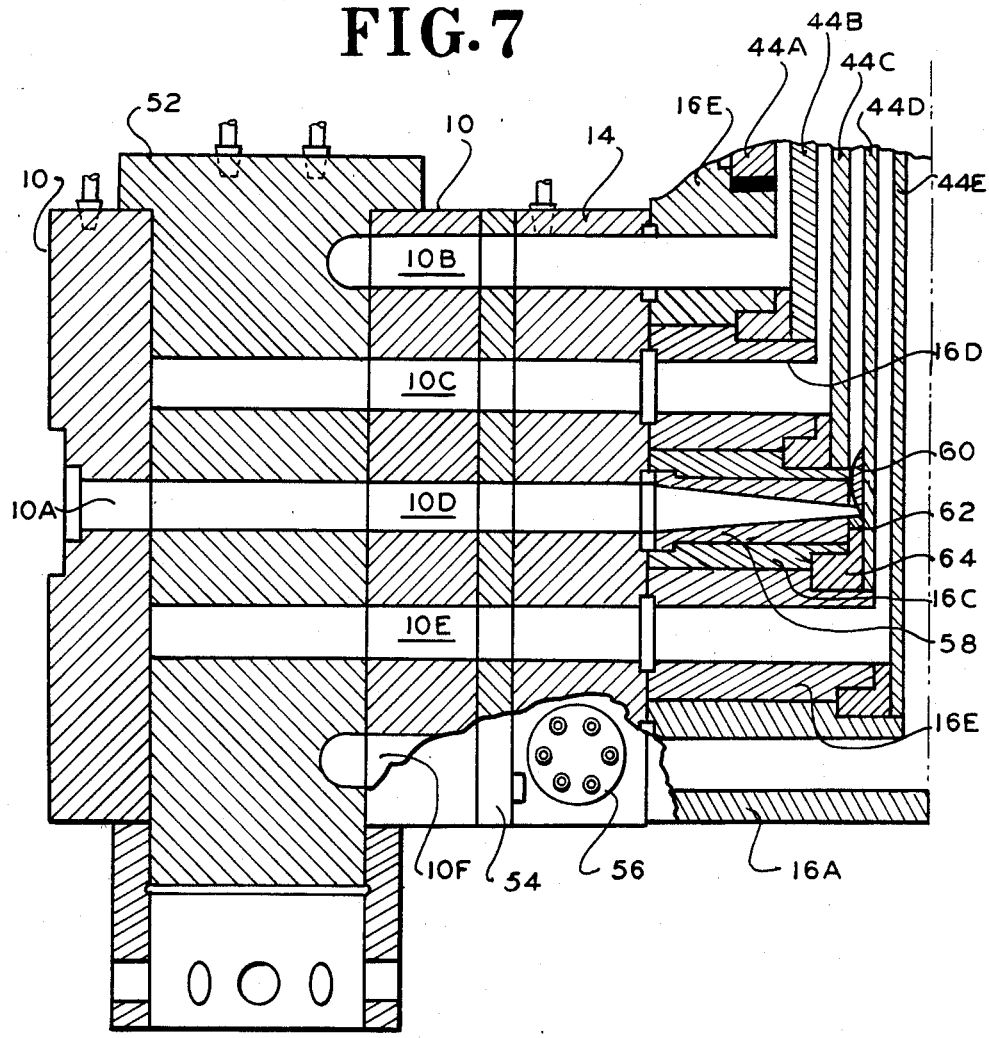
FIG. 7 is a schematic view of the block assembly at the lower portion of the die of FIG. 1 with portions broken away for illustrative purposes.
Figure 8:
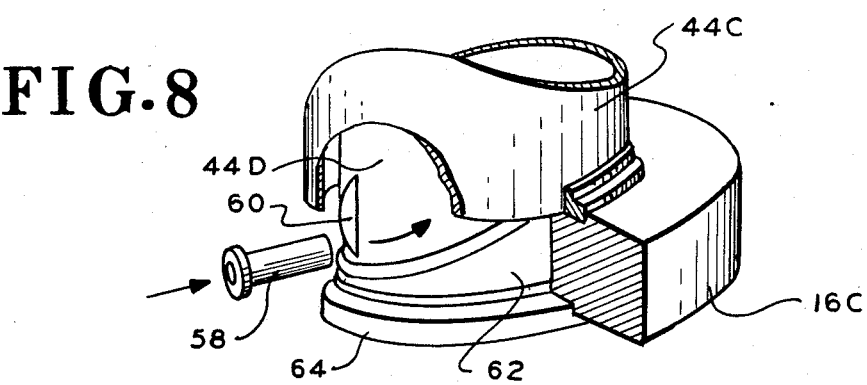
FIG. 8 is a schematic, perspective view (portions broken away for clarity) of the diverter, flow valve and block assembly of FIG. 7.

Referring to FIGS. 7 and 8, previously mentioned diverter block 10 is shown to be a hollow cylindrical component having various inlet ports 10A. The center of diverter 10 contains insert 52, a metal cylinder having grooves on its outside to channel extrudate flow. For example, helical spirals on the outside of diverter cylinder 52 can transmit the extrudate into five coplanar flowpaths as illustrated at ports 10B, 10C, 10D, 10E and 10F. Alternatively, where the elevation of the extrudate flow need not be changed, the path in diverter cylinder 52 can be a simple straight bore across cylinder 52. A ported adapter plate 54 is used to attach valve assembly 14 to the diverter block 10. Valve assembly 14 in this embodiment has five crossbores each covered by an access cover 56, that may be replaced with an optional valve to control the amount of extrudate flow along the channels 10B-10F.

Previously illustrated blocks 16A-16E (operating herein as a flow means) have a washer-like structure and stack atop each other, each adjacent, upper block having a progressively larger inside diameter to join with the nested tubes 44A-44E. For example, tube 44A fits into a countersunk portion atop block 16E while tube 44B is sealed against the inside diameter of block 16E. Consequently, flow port 10B communicates to the space between tubes 44A and 44B. Similar remarks apply with respect to the successively smaller tubes.

Each of the block assemblies 16A–16E have inlet conduits aligned with flow ports 10B–10F.

Block 16C is shown having an enlarged inlet conduit fitted with a venturi tube 58, a tube having a flanged outer end and a bore which converges toward its inner end. Venturi tube 58 opens to the space between tubes 44C and 44D. Mounted on the outside face of tube 44D at the outlet of venturi tube 58 is a flow splitter 60, a fin designed to divert extrudate away from the opening of tube 58. Underlying splitter 60 is an annular ramp 62 resting atop ring seal 64. Ramp 62 is in the form of a hollow truncated cylinder having its shortest height aligned with the inlet of venturi tube 58.

To facilitate an understanding of the principles associated with the foregoing apparatus its operation will now be briefly described. The co-extrusion die of FIG. 1 may be set up at a station with one to five extruders (not shown) connected to extruder inlets 12 of diverter block 10. Depending upon the desired flow rate, valves may be installed in flow valve block 14. In the embodiment of FIG. 1, the upper portion of the die may be rotated by connecting a chain drive or gear to oscillator/rotator 20. The extruders (not shown) process small, solid plastic pellets, or powder by forcing the same through a barrel by rotating an internal extruder screw (not shown). The outside of this barrel is heated by electrical resistance-type heaters (not shown). This heat and the shear forces of the extruder screw tends to change the solid pellets into a viscous molten fluid.

The disclosed embodiment is designed to fabricate five layers. Although various types of materials can be used depending upon the desired characteristics of the finished tube, in this embodiment the center layer is fabricated of Saran TM. As explained hereinafter, this center layer is most appropriately formed by the "spider" type of extrusion. Other materials, however, such as polyvinyl chloride can be employed instead at the center layer. The two other internal layers can be of a low density polymer or an adhesive to seal the layers. Preferably, a high density polymer is used for the outside layers to acheive greater strength and tear resistance. It will be appreciated however, that various other extrudable materials can be used without departing from the scope of the present invention.

As shown in FIG. 7, the various polymers flowing through channels 10B–10F reach the blocks 16A–16E where they are injected into the spaces between tubes 44A–44E (as well as into tube 44E). In this embodiment, tube 44A as well as blocks 16A–16E remain stationary while tubes 44B, 44C, 44D and 44E rotate.

Because the central port 10D employs converging venturi tube 58, it accelerates the extrudate and injects it onto splitter 60. It will be appreciated that splitter 60 remains stationary and may be affixed either to tube 44D or block 16C. The splitter 60, made of stainless steel as an investment casting, prevents the extrudate from languishing at the exit of venturi tube 58. As shown in FIG. 8, the extrudate is also forced upwardly by ramp 62 so that there is not a tendency for extrudate to stagnate on the side of tube 44D opposite tube 58.

The different extrudates flow up tubes 44A–44E, eventually reaching mandrels 22A–22E. Extrudate within tube 44E is diverted into eight bores such as bore 36. Similarly, the extrudates flowing around tubes 44B, 44C and 44E enter bores 30, 32 and 34, respectively. Eventually extrudate reaches the bushings 48 at the origin of the spirals 24. The bushings 48 act like a 90° elbow which is hand polished to make a smooth blend and transition. Accordingly, at each bushing 48, the extrudate is injected into a corresponding spiral groove 24. In contrast to the conventional spirals used in the industry (milled grooves with a sperical radius at the bottom of the groove so that the depth and width is consistent throughout) spiral grooves 24 are designed to increase the velocity and flow distribution characteristics of various heat sensitive polymers such as Saran or PVDC. Spiral 24 incorporates a 28° angle for the sidewalls and starts out at 0.375 inch wide by 0.375 deep and feathers out to a smooth blend at the end of the spiral 24. Accordingly, as the extrudate flows down spiral groove 24, the velocity increases to produce a "venturi" type of effect. Spiral grooves 24 with their angled sides offers a minimum of resistance to polymers and forces them to distribute evenly about the circumference of the die mandrel. It will be noted that the polymers can flow not only in spiral grooves 24 but can move into the space between adjacent mandrels, for example, the cylindrical space between mandrels 22A and 22B. This effect tends to eliminate stagnant or dead flow areas. It will also be noted that bushing 48 (FIG. 6C) has a smooth 15° outlet angle and a decreasing area, venturi nozzle. Accordingly, the extrudate is injected at a slight angle but at an increased velocity so that smooth injection occurs.

Extrudate also flows between tubes 44C and 44D into the conical-annular passage 38. The effective cross sectional flow area increases at the transition into passage 38. Accordingly, the extrudate flows slower in passage 38 to improve the distribution of the extruding material. Web 41 is designed to serve as both a flow splitter, spacer and fluidic diverter simultaneously. In addition, web 41 predetermines the precise gap setting required to process Saran or PVDC between mandrels 22B and 22C. Due to its parabolic shape, web 41 causes the least amount of fluidic disturbance to the molten polymers and also causes a minimum pressure drop or loss of velocity head. Moreover, because of its shape, flow splitting web 41 negates secondary flow and stagnation areas where the polymers could burn or degrade.

Accordingly, the extrudate merges into the passage along conical wall 27. It is important to notice that the spacing between the mandrels 22 and the conical wall 27 increases in the downstream direction. The increase is sized so that the extrudate regularly slows as it approaches annular outlet 28. This deceleration occurs in steps at the intersection existing at the junctions between adjacent mandrels. This step-wise deceleration ensures that the layers adhere uniformly and produce a strong and consistent product. The multilayer extrudate eventually reaches the vertical path and emerges from annular outlet 28 where it is drawn up, allowed to cool and wrapped onto a roll. If bags are desired, the resulting tube can be periodically severed and heat sealed at one end.

It is desirable to replace mandrels within the die of FIG. 2. This can be done by removing the various bolts (not shown) holding casing 26 over mandrels 22A–22E. After casing 26 is removed, the mandrels can be detached by removing bolts such as bolt 42. It is contemplated that replacement mandrels can convert spiral gaps to "spider" type or vice versa. For example, it may be desirable to change the spiral-type of extrusion between mandrels 22D and 22E to a "spider" type of extrusion. Accordingly, mandrels 22D and 22E are removed and replaced with different mandrels in which the joint between them is similar to that between mandrels 22B and 22C. The spacing between the new mandrels is maintained by splitters such as web 41. Also unique to this design is the ability to remove just the core layer pin and replace it with a new special core layer pin and flow bushings. After reassembling the mandrels and casing head, the die can be operated in a manner similar to that such described. It is to be appreciated that various modifications can be implemented with respect to the above described embodiments. For example, the number of layers can be different than five. Also, the combination of "spiral" and "spider" type of extrusion can be changed depending upon the material being processed. Furthermore, while a rotating tube is shown, in other embodiments rotation will not be used. Additionally, the particular shape of the flow splitters (both the web and the one in the inlet of the flow means) can be shaped differently depending upon the viscosity, temperature and other characteristics of the extrudate. Furthermore, the number of webs per mandrel can be changed depending upon the size and desired structural rigidity of the associated mandrels. Also, the various proportions of the respective flow paths can be changed depending upon the dimensions of the die and the thickness of the resultant layers. Furthermore, the number of spirals per mandrel can be changed depending upon the need for consistency. In addition, the flow bushings feeding the spiral grooves can be shaped differently depending upon the machining considerations, provided that a turning of the extrudate is performed by that bushing. Additionally, various electric heaters and valves can be used to alter the flow rate and temperature of the extrudate.

Obviously, many modifications and variations of the present invention are possible in light of the above teachings. It is, therefore, to be understood that within the scope of the appended claims, the invention may be practiced otherwise than as specifically described.

What is claimed is:

1. A co-extrusion die for simultaneously extruding different extrudate into a multilayer tube comprising:
   a casing having an inlet side and an outlet side; and
   a plurality of mandrels coaxially nested within said casing about a predetermined axis, said casing being shaped on the interior of its outlet side to mate with said mandrels and provide an annular outlet, said casing and said mandrels being positioned and shaped to form a plurality of interspaces, at least one of said interspaces shaped to define an annular passage, another shaped to define a spiral passage, said annular and spiral passages communicating with said annular outlet, said annular passage having a shape for providing noncircumferential extrudate flow, said annular passage having an upstream end marked by a columnar to annular transition, said transition ending where it encircles without intersecting said predetermined axis.

2. A co-extrusion die according to claim 1 wherein said mandrels are shaped to provide one of said interspaces at the perimeter of each of said mandrels, each of said interspaces communicating with said annular outlet.

3. A co-extrusion die according to claim 2 wherein predetermined ones of said mandrels each have on their outside a cylindrical surface bearing a plurality of spiral grooves.

4. A co-extrusion die according to claim 3 wherein each of said spiral grooves are narrower and shallower for positions closer to said annular outlet.

5. A co-extrusion die according to claim 3 wherein each of said spiral grooves has an upstream and communicating with a coterminous bore into the associated one of the mandrels, said die comprising:
   a plurality of bushings each inserted into a corresponding coterminous bore, said bushing being channelled to divert the radial component of motion of said extrudate into a primarily tangential component.

6. A co-extrusion die according to claim 3 further comprising:
   a plurality of nested tubes coaxially connected to said mandrels at the outlet side of said casing to form a plurality of axial passageways, each of said interspaces being shaped and ported to communicate with a corresponding one of said axial passageways.

7. A co-extrusion die according to claim 6 further comprising:
   a block assembly connected to the downstream end of said nested tubes and having a plurality of inlet conduits, each communicating with a corresponding one of said axial passageways.

8. A co-extrusion die according to claim 7 wherein one of said inlet conduits converges to accelerate said extrudate upon delivery into said tubes.

9. A co-extrusion die according to claim 8 further comprising:
   an annular ramp encircling that one of said tubes facing the downstream end of one of said conduits and beveled to force downstream the extrudate moving circumferentially away from said conduit.

10. A co-extrusion die according to claim 7 further comprising:
    a splitter located at the downstream end of one of said conduits for diverting therefrom said extrudate.

11. A co-extrusion die according to claim 10 further comprising:
    an annular ramp encircling that one of said tubes facing the downstream end of one of said conduits and beveled to force downstream the extrudate moving circumferentially away from said conduit.

12. A co-extrusion die according to claim 7 further comprising:
    an annular ramp encircling that one of said tubes facing the downstream end of one of said conduits and beveled to force downstream the extrudate moving circumferentially away from said conduit.

13. A co-extrusion die according to claim 6 further comprising:
    an annular ramp encircling that one of said tubes facing the downstream end of one of said conduits and beveled to force downstream the extrudate moving circumferentially away from said conduit.

14. A co-extrusion die according to claim 6 wherein each of said interspaces has a working portion and an upstream portion, the latter providing an inlet to said interspace, said working portion being concentrated on a cylindrical surface, said upstream portion being concentrated on a frusto-conical surface.

15. A co-extrusion die according to claim 14 further comprising:
    a plurality of circumferentially spaced webs mounted across said annular passage to maintain its thickness, each of said webs having a lenticular shape to split smoothly the extrudate flowing past the webs.

16. A co-extrusion die according to claim 15 wherein each of said webs comprises:

a lenticular plate having on each side an opposing boss, one perpendicular to said plate, the other aligned for mounting parallel to the axis of said mandrels.

17. A co-extrusion die according to claim 16 wherein each of said interspaces has a working portion and an upstream portion providing an inlet to said interspace, said working portion, the latter being concentrated on a cylindrical surface, each of said webs being mounted with one of its bosses fitted into the outside of a corresponding one of said mandrels at the upstream portion of a corresponding one of said interfaces.

18. A co-extrusion die according to claim 14 wherein said frustro-conical surface diverges in a downstream direction.

19. A co-extrusion die according to claim 18 wherein said annular passage extends through said cylindrical and said frustro-conical surface, said annular passage along said frusto-conical surface being sized to cause the flow rate of said extrudate thereat to be slower than that at positions immediately upstream and downstream of said frusto-conical surface.

20. A co-extrusion die according to claim 3 wherein said casing has an interior, frusto-conical wall converging onto said annular outlet, so that said different extrudates flowing through said interspaces is directed radially inward toward said annular outlet.

21. A co-extrusion die according to claim 20 wherein said interspaces intersect said frustro-conical wall at spaced positions, whereby each of said different extrudates join the flow along the wall at different times so that only one layer of extrudate is added to the flow at a time.

22. A co-extrusion die according to claim 21 wherein the spacing of said frustro-conical wall from said mandrels at the intersections of said wall with said interspaces is sucessively greater in a downstream direction.

23. A co-extrusion die according to claim 22 wherein said spacing of said frustro-conical wall from said mandrels is sized to allow extrudate flowing along said wall to decelerate as successive layers are added thereto.

24. A co-extrusion die according to claim 1 wherein said plurality of interspaces is at least five in number.

25. A co-extrusion die according to claim 1 wherein said mandrels are detachable, said die including;
a modification insert sized to replace one of said mandrels having said spiral grooves, said insert being sized to provide a non-spiralled, annular passage.

26. A co-extrusion die for simultaneously extruding different extrudate into a multilayer tube, comprising:
a casing having an inlet side and an outlet side;
a plurality of mandrels coaxially nested within said casing, said casing being shaped on the interior of its outlet side to mate with said mandrels and provide an annular outlet, said casing and said mandrels being positioned and shaped to form a plurality of interspaces communicating with said annular outlet;
a plurality of nested tubes coaxially connected to the outlet side of said casing to form a plurality of axial passageways, each of said interspaces shaped and ported to communicate with a corresponding one of said axial passageways; and
a flow means connected to the downstream end of said nested tubes and having a plurality of inlet conduits, each communicating with a corresponding one of said axial passageways, said flow means being operable in at least a predetermined one of said inlet conduits to divert said extrudate away from predetermined stagnation points about that one of said tubes facing said predetermined one of said conduits, said flow means being operable to increase the velocity of said extrudate while being turned from a primarily radial direction into a direction having circumferential and axial components primarily.

27. A co-extrusion die according to claim 26 wherein said flow means comprises:
an annular ramp encircling one of said tubes facing the downstream end of one of said conduits, said ramp being beveled to force downstream the extrudate moving circumferentially away from said conduit.

28. A co-extrusion die according to claim 26 wherein one of said inlet conduits converges to accelerate said extrudate upon delivery into said tubes.

29. A co-extrusion die according to claim 28 further comprising:
an annular ramp encircling one of said tubes facing the downstram end of one of said conduits, said ramp being beveled to force downstream the extrudate moving circumferentially away from said conduit.

30. A co-extrusion die according to claim 27 further comprising:
a splitter located at the downstream end of one of said conduits for diverting therefrom the extrudate.

31. A co-extrusion die according to claim 26 wherein said flow means comprises:
a splitter located at the downstream end of one of said conduits for diverting therefrom said extrudate.

32. A co-extrusion die according to claim 27 further comprising:
an annular rammp encircling one of said tubes facing the downstream end of one of said conduits, said ramp being beveled to force downstream the extrudate moving circumferentially away from said conduit.

* * * * *